(12) United States Patent
Yamamoto et al.

(10) Patent No.: US 8,597,843 B2
(45) Date of Patent: Dec. 3, 2013

(54) COOLING SYSTEM FOR BATTERY PACK

(75) Inventors: Kouichi Yamamoto, Shizuoka (JP); Akihito Shibuya, Aichi (JP); Hiroki Maegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 618 days.

(21) Appl. No.: 12/656,972

(22) Filed: Feb. 22, 2010

(65) Prior Publication Data
US 2011/0020686 A1    Jan. 27, 2011

(30) Foreign Application Priority Data

Feb. 24, 2009    (JP) ................................. 2009-040116

(51) Int. Cl.
*H01M 2/20*    (2006.01)
*H01M 10/50*    (2006.01)

(52) U.S. Cl.
USPC ........................... 429/434; 165/181; 429/120

(58) Field of Classification Search
USPC ......... 429/120, 149, 433, 434, 437, 438, 439, 429/452, 467, 471, 72; 165/181, 185
See application file for complete search history.

(56) References Cited

U.S. PATENT DOCUMENTS

| | | | | |
|---|---|---|---|---|
| 6,111,387 A * | 8/2000 | Kouzu et al. | ................... | 320/107 |
| 7,611,798 B2 * | 11/2009 | Yoon et al. | ...................... | 429/91 |
| 7,955,729 B2 * | 6/2011 | Onuki et al. | .................. | 429/163 |
| 2004/0130288 A1 * | 7/2004 | Souther et al. | ................ | 320/104 |
| 2004/0180257 A1 * | 9/2004 | Kimoto | .......................... | 429/120 |
| 2005/0208375 A1 * | 9/2005 | Sakurai | .......................... | 429/162 |
| 2008/0118819 A1 * | 5/2008 | Gamboa et al. | ................. | 429/61 |
| 2008/0318118 A1 * | 12/2008 | Ghosh et al. | .................... | 429/88 |
| 2010/0035139 A1 * | 2/2010 | Ghosh et al. | .................. | 429/120 |
| 2010/0216004 A1 * | 8/2010 | Yoon | ............................... | 429/99 |
| 2012/0141848 A1 * | 6/2012 | Nagaoka et al. | ............... | 429/92 |

FOREIGN PATENT DOCUMENTS

| | | | |
|---|---|---|---|
| JP | 2001-057196 A | | 2/2001 |
| JP | 2002373638 | * | 12/2002 |
| JP | 2004-031049 A | | 1/2004 |
| JP | 2005071674 | * | 3/2005 |
| JP | 2006-210245 A | | 8/2006 |
| JP | 2008123769 | * | 5/2008 |
| WO | WO 2007/032270 | * | 3/2007 |

OTHER PUBLICATIONS

Derwent translated Abstract for JP2008123769, Aota et al, May 2008.*
Derwent Abstract for Document JP 2005071674, Mar. 2005, Kawai et al.*
Derwent Abstract for Document JP 2002373638, Dec. 2002, Ogami.*

* cited by examiner

*Primary Examiner* — Joseph Drodge
(74) *Attorney, Agent, or Firm* — Edwards Wildman Palmer LLP

(57) ABSTRACT

A cooling system for a battery pack which can reduce the number of components, manufacturing cost and an installation space, is provided. The battery pack includes high-voltage electrically conductive paths connected to a positive electrode and a negative electrode thereof, respectively. The high-voltage electrically conductive path connected to the positive electrode serves as a cooling member. The high-voltage electrically conductive path connected to the positive electrode is arranged along the battery pack to absorb heat generated at the battery pack and dissipate the absorbed heat at a location distant from the battery pack. The invention takes an advantage of the superior heat conductivity of the high-voltage electrically conductive path to cool down the battery pack.

14 Claims, 6 Drawing Sheets

COOLING SYSTEM FOR BATTERY PACK

CROSS-REFERENCE TO RELATED APPLICATIONS

This application claims priority to Japanese Patent Application Number 2009- 40116 filed on Feb. 24, 2009, the contents of which are fully incorporated herein by reference.

BACKGROUND

1. Field of the Invention

The present invention relates to a cooling system for a battery pack including a plurality of battery cells.

2. Description of Related Art

Japan Patent Publication Number 2001-57196 discloses a battery pack 1 shown in FIG. 6. The battery pack 1 includes a plurality of battery cells 2 connected electrically in series. The plurality of cells 2 are bound together mechanically in parallel and integrated by a band 4 connecting end plates 3 provided at outermost battery cells 2, as shown.

Numeral references 5 and 6 in FIG. 6 indicate connecting modules (also called as bus-bar modules or battery connecting plates). The connecting modules 5 and 6 include connecting clamps (bus bar) to connect electrodes 7 of the adjacent cells 2, and are formed by insert molding the connecting clamps in a resin holder. The connecting module 5 also includes a battery-voltage-detecting terminal, while the connecting module 6 only includes the connecting clamps. A lead wire is connected to the battery-voltage-detecting terminal and to a battery-voltage-detecting unit 8. Electric wires connected to each of positive and negative electrodes of the battery pack 1 are not shown.

Another example of the connecting module (bus-bar module, battery connecting plate, etc.) is disclosed in Japanese Patent Publication Number 2004-31049 by the applicant of the present application.

The battery pack supplies electric power to an electric motor of, for example, an electric-motor vehicle or a hybrid-electric-motor vehicle. Recently, lithium-ion secondary batteries are used for the battery pack. It is known that in use, the battery pack generates extreme heat, for example at the time of large current discharge. In order to cool the battery pack, a cooling system as disclosed in Japan Patent Publication Number 2006-210245 is known.

The cooling system disclosed in Japan Patent Publication Number 2006-210245 includes a heat pipe having a heat absorbing member, a heat dissipating member, a fin and a flat-plate (portion). This heat pipe is arranged integrally with the battery pack for cooling the battery pack.

For the cooling system of the prior art, a separate unit which is dedicated for cooling, i.e. the above-described heat pipe, is employed. This leads to an increase in manufacturing cost and also an increase in a number of components required for the battery pack. Furthermore, since the heat pipe includes the heat absorbing member, the heat dissipating member, the fin and the flat-plate, the heat pipe itself includes a number of components, thereby requires many steps in manufacturing. Furthermore, an installation space for the heat pipe must be taken into account.

SUMMARY OF THE INVENTION

In view of the above-described problems, an object of the invention is to provide a cooling system for a battery pack, which can reduce the number of components, the manufacturing cost, and an installation space.

For achieving the object, a cooling system for a battery pack having a plurality of battery cells according to the present invention includes high-voltage electrically conducting paths (such as high-voltage electric wires and bus bars) connected respectively to a positive electrode and to a negative electrode of the battery pack, wherein at least one of the high-voltage electrically conducting paths is arranged along the battery pack to serve as a cooling member of the battery pack.

The cooling system according to the present invention does not require installing a separate and dedicated cooling member, but the high-voltage electric wires and the bus bar serve instead as a cooling member. Thus, a number of components, manufacturing cost and an installation space for the cooling system can be reduced. Furthermore, the cooling system according to the invention uses the superior heat conductivity of the electric wire (thick electric wire) and the bus bar. The high-voltage electrically conducting path (i.e., the thick electric wire and the bus bar) has large surface area and is cooled down with distance from the battery pack, thus has significant heat absorption efficiency and heat dissipation efficiency.

For achieving the object, a cooling system according to the present invention is the cooling system as described above, where the battery cells are connected electrically in series by a bus-bar module having a plurality of bus bars and a resin member, and wherein at least one of the resin member and the bus bar serves as a cooling member of the battery pack (such as the resin member being a second cooling member and the bus bar being a third cooling member).

According to the present invention, the resin member of the bus-bar module and/or the bus bars are used as the cooling member. The bus-bar module is usually large because the bus-bar module includes the plurality of bus bars for connecting the electrodes of the adjacent battery cells and the resin member for holding these bus-bars. Thus, the resin member of this bus-bar module can serve as the cooling member, for example, by absorbing heat at a surface on one side thereof and dissipating the heat at a surface on the other side thereof. Also, the heat absorbing and dissipating effect can be enhanced by further utilizing the bus bars. Furthermore, by utilizing the resin member of the bus-bar module and the bus bars as the cooling member, the number of components, manufacturing cost and an installation space can be reduced compared to employing separate and dedicated for cooling components.

For achieving the object, a cooling system according to the present invention is the cooling system as described above, where an installation portion for the high-voltage electrically conducting path is provided at the resin member.

According to the present invention, since the an electrically-conducting-path and the resin member of the bus-bar module are provided so as to contact each other, the heat absorbing effect and the heat dissipating effect can be enhanced.

For achieving the object, a cooling system according to the present invention is the cooling system as described above, where a heat conductive member is provided at least one of a position between the bus-bar and the resin member and a position between the battery cell and the bus-bar module.

According to the present invention, heat conductivity in which the heat conducting towards the bus-bar module and towards the bus bars can be improved, thus the heat absorbing effect and the heat dissipating effect can be enhanced.

For achieving the object, a cooling system according to the present invention is the cooling system as described above, where the resin member is formed of one material selected from a group including a silicone resin material and an epoxy resin material.

According to the present invention, the resin portion is formed of the material having larger heat conductivity than, for example, polypropylene which is used commonly, thus the heat absorbing and dissipating effect can be enhanced.

For achieving the object, a cooling system according to the present invention is the cooling system as described above, where at least one of the high-voltage electrically conductive paths are arranged between positive electrodes and negative electrodes of the battery cells to serve as a cooling member of the battery pack.

According to the present invention, when a position between a positive electrode and a negative electrode of the battery cells are arranged to be a hot area, the heat of the area or the surrounding area can directly or indirectly transmit to the high-voltage electrically conducting path for cooling. Thus, cooling efficiency can be enhanced.

DETAILED DESCRIPTION OF THE INVENTION

Figure 1:
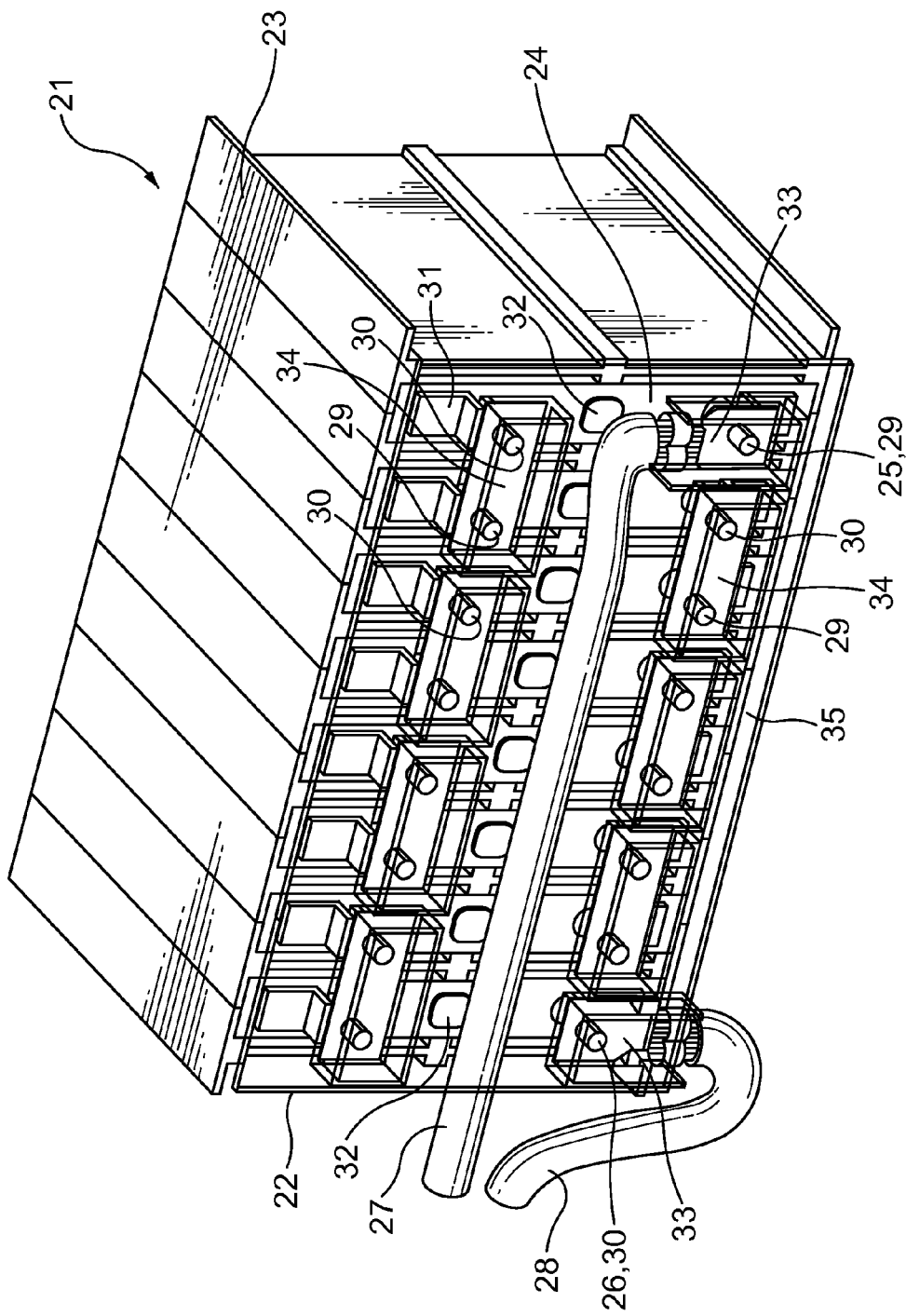
FIG. 1 is a perspective view of one embodiment of a cooling system for a battery pack according to the present invention.
Figure 2:
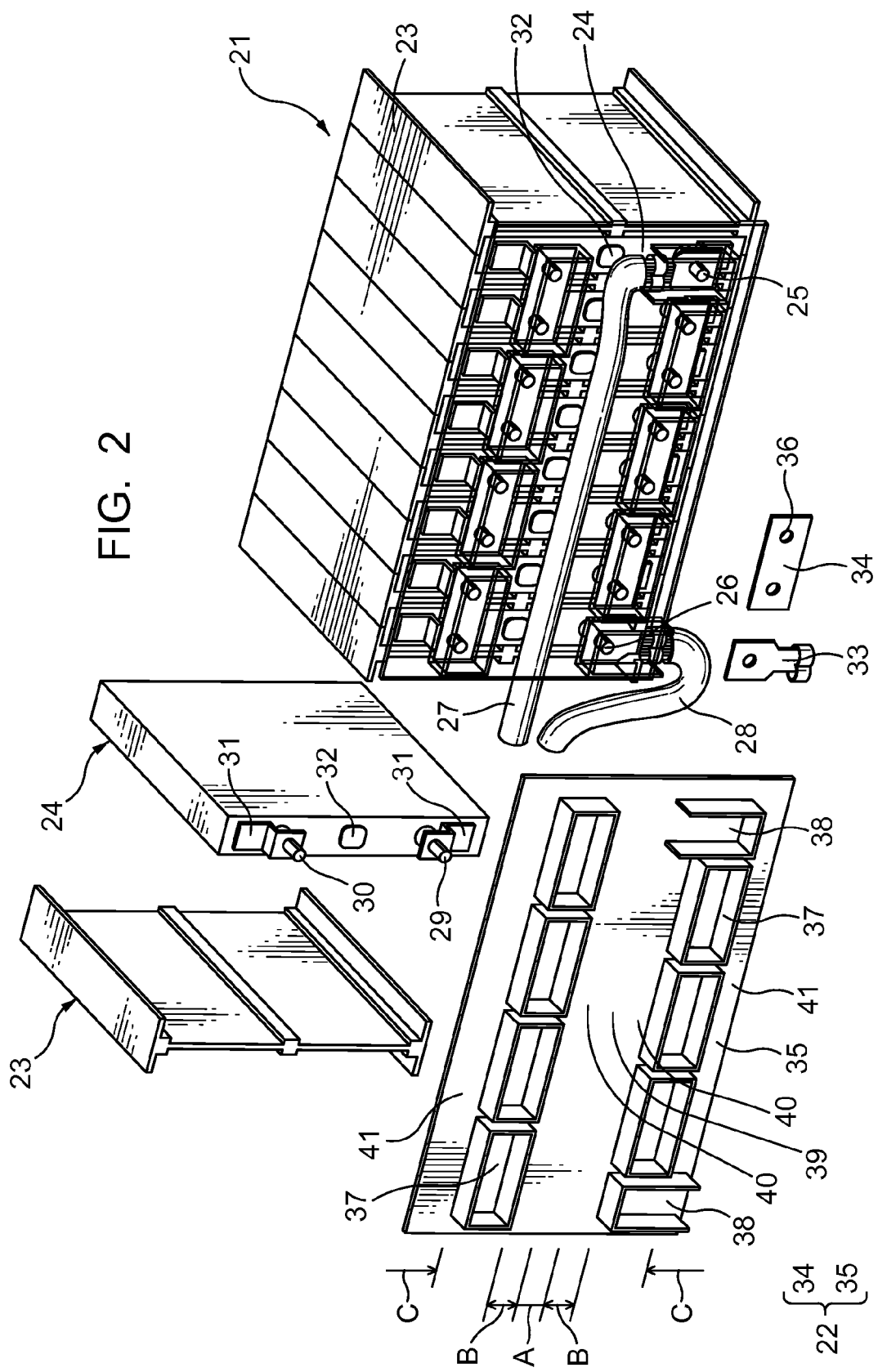
FIG. 2 is an exploded perspective view of the battery pack according to the invention.

A cooling system for a battery pack according to the present invention will now be described with reference to the drawings. FIG. 1 is a perspective view of the battery pack showing one embodiment of the cooling system for the battery pack according to the present invention. FIG. 2 is an exploded perspective view of the battery pack.

FIG. 1 and FIG. 2 show the battery pack 21 with a bus-bar module 22 attached thereto. Although a lithium-ion secondary battery is used for the battery pack 21 in this embodiment, other kinds of battery can be used. The battery pack 21 is employed to, for example, an electric-motor vehicle or a hybrid-electric-motor vehicle and supplies electric power thereto.

The battery pack 21 is provided with the plurality of battery cells 24 arranged, by retainers 23, in a line along a predetermined direction. The plurality of cells 24 of the battery pack 21 is electrically connected in series by the bus-bar module 22.

Thick electric wires 27, 28 (for example having wire size of 5 to 300 sq.) are connected respectively to a positive electrode 25 and a negative electrode 26 of the battery pack 21. The thick electric wires 27, 28 correspond to high-voltage electrically conducting paths described in claims, and several examples of the high-voltage electrically conducting paths will be described later. The thick electric wire 27 serves as, other than its original function as an electric wire, a cooling member. That is, the thick wire 27 is wired along the battery pack 21, so as to absorb heat generated at the battery pack 21 and dissipate (release) the absorbed heat at a location distant from the battery pack 21. In this manner, above-described cooling system of the present invention can cool down the battery pack 21, by taking advantage of the superior heat conductivity of the electric wire. Furthermore, the cooling system according to the invention using the thick wire 27 as a cooling member does not require additional installation of a separate component which is dedicated for cooling the battery pack. The thick wire 27, due to a large surface area thereof, shows superior heat absorption effect and heat dissipation effect. Examples other than electric wires having large surface area will be described later.

In this embodiment, the thick wire 28 connected to the negative electrode 26 is wired in at a typical position. However, it is possible to arrange the thick wire 28 to be wired along the battery pack 21 to make the thick wire 28 to serve as the cooling member as the above-described thick wire 27.

Prior to going into an explanation of a specific wiring arrangement of the thick wire 27 connected to the positive electrode 25, structure of the battery pack 21 and the bus-bar module 22 will be described below with reference to FIGS. 1 and 2.

The battery cells 24 are of known and are formed in a box-shape. Each of the cells 24 includes a pair of electrodes (electrode posts) 29 and 30. The electrode 29 is a positive electrode and the electrode 30 is a negative electrode. Each of the electrodes 29, 30 is provided with a metal connecting mount 31 bent in a clunk-shape. A safety valve 32 is disposed between the pair of electrodes 29, 30 (with an equal distance from the respective electrodes). The safety valve 32 includes a thin cover. In this embodiment, a portion where a row of the safety valves 32 is provided or a portion between the pair of electrodes 29, 30 of the battery cells 24 correspond to a high-temperature area (hot area) of the battery pack 21.

In this embodiment, the battery pack 21 includes eight cells 24, however, this number can be variable. As shown in FIG. 1, the electrode 29 of the cell 24 located at the rightmost end corresponds to the positive electrode 25 of the battery pack 21, and the thick wire 27 is connected thereto. The thick wire 27 is connected via a connection terminal 33. The electrode 30 of the cell 24 located at the leftmost end corresponds to the negative electrode 26 of the battery pack 21, and the thick wire 28 is connected thereto. The thick wire 28 is also connected via the connection terminal 33. The other electrodes 29, 30 (the positive and the negative electrodes) of the adjacent cells 24 are connected to each other by a bus bar 34 of the bus-bar module 22.

The retainers 23 serve to arrange the plurality of cells 24 in a line in a predetermined direction. The number of the retainers 23 equals the number of the cells 24 plus one (thus, in this embodiment there are nine retainers 23). The retainer 23 includes a portion to be located between the adjacent cells 24 and a portion for attaching the adjacent retainers 23.

The bus-bar module 22 includes a plurality of bus bars 34 for connecting the positive and the negative electrodes of the adjacent cells 24 and a resin member 35 for holding the bus bars 34. The bus bar 34 is a rectangular strip-shaped metal and has holes 36 through which the electrodes 29, 30 penetrate.

The insulating resin member 35 includes bus-bar installation portions 37 each holding the bus bar 34, connection-terminal installation portions 38 holding the connection terminal 33 and a thick-wire installation portion 39 (i.e., a high-voltage electrically conducting path installation portion) to which the thick wire 27 is wired and held. The electrodes 27, 28 are connected to the connection terminals 33. The bus-bar installation portions 37 are arranged along a row of the electrodes 29, 30 connected to each other by the bus bar 34. The location of the respective connection-terminal installation portions 38 correspond to connecting position of the thick wires 27, 28. The thick-wire installation portion 39 is provided along a row of the safety valves 32, and corresponds to a range indicated with an "A" in FIG. 2.

Although it is not shown, the thick-wire installation portion 39 is formed to hold the thick wire 27, the cooling member, so as the thick wire 27 is in contact with the thick-wire installation portion 39. For example, a hook or a cover can be used to hold the thick wire 27, or the thick wire 27 can be fixed by glue or by metal having high thermal conductivity. Furthermore, although the thick-wire installation portion 39 is shown as a flat plate in FIG. 2, the thick-wire installation portion 39 can also be a groove. In this embodiment, as described hereinafter, since the resin member 35 may serve as a second cooling member, the thick-wire installation portion 39 should preferably be arranged so as to contact with the thick wire 27 with no air space therebetween.

Portions between the thick-wire installation portion 39 and the respective bus-bar installation portions 37 (spaces between the thick wire 27 and the respective rows of the electrodes 29, 30) correspond to a thin-wire-for-thermistor wiring space 40 to which thin electric wires of a thermistor (not shown) are wired. The thin-wire-for-thermistor wiring space 40 corresponds to a range indicated with a letter "B" in FIG. 2. The thin wires can be other than the one for the thermistor, as long as they are insusceptible to a high-temperature heat around the safety valves 32. The advantage of using the thin wires of the thermistor is that, a chance of short when coverings of the thin wires melt can be reduced since the thin wires are limited in number. It can be said that the thin wires are low-voltage electrically conducting paths.

Outward portions outside the bus-bar installation portions 37 correspond to thin-wire-for-lead wiring spaces 41 to which lead wires (thin wires) are wired. The thin-wire-for-lead wiring spaces 41 are indicated by "C" in FIG. 2. Since battery-voltage detecting terminals (not shown) are connected respectively to each of the cells 24, the lead wires (the thin wires) are wired to the thin-wire-for-lead wiring spaces 41 in an assembled form.

The resin member 35 is a resin molded item molded using a silicone resin or an epoxy resin, or blending a silicone resin or an epoxy resin with a base resin. The resin member 35 has higher heat conductivity compared to, for example, a commonly used polypropylene (the heat conductivity of polypropylene is 2.8 $[10^{-4}$ cal/cm·sec·° C.], whereas the heat conductivities of the silicone and the epoxy resin are 3.5 to 7.5 $[10^{-4}$ cal/cm·sec·° C.] and 4.2 to 5.0 $[10^{-4}$ cal/cm·sec·° C.], respectively, which are 1.25 to 2.7 and 1.5 to 1.8 times that of the polypropylene, respectively). The resin member 35 has great heat absorbing and heat dissipating effects, thus serves as the second cooling member.

With the structure as described above, a rise in temperature of the battery pack 21 is prevented by the thick wire 27 serving as a cooling member (a first cooling member) and also by the resin member 35 serving as the second cooling member. Thus, the temperature is equalized across the battery pack 21.

Consequently, according to the present invention, the thick wire 27 is used as the cooling member for the battery pack 21, thus the number of components and the manufacturing cost are reduced compared to a battery pack provided with a separate dedicated-for-cooling component. Furthermore, since the thick wire 27 is utilized as the cooling member, an installation space for installing the dedicated-for-cooling member, such as the heat pipe of the prior art, can be eliminated.

Furthermore, according to the present invention, the resin member 35 of the bus-bar module 22 also serves as the cooling member for the battery pack 21, thus also reducing the number of components, the manufacturing cost and the installation space for the separate dedicated-for-cooling component.

Furthermore, according to the present invention, since the thick wire 27 is arranged along the row of the safety valves 32 or along a portion between the positive and the negative electrodes of the battery cells (i.e., along the high-temperature area (hot area) of the battery pack 21), the surrounding area of the safety valves 32 as well as the whole battery pack 21 can be cooled down.

Of course, various changes and modifications can be made within the scope of the invention.

Furthermore, the bus bars 34 can serve as a third cooling member, since the bus bars 34 are metal and has superior heat absorption and heat dissipation efficiencies.

In order to improve the heat absorption and heat dissipation efficiencies, heat conductive member 42, 43 and 44 shown in FIGS. 3A through 3F can be provided. FIGS. 3A through 3F are cross-sectional views of the battery pack showing several examples of way of providing the heat conductive member.

Figure 3A:
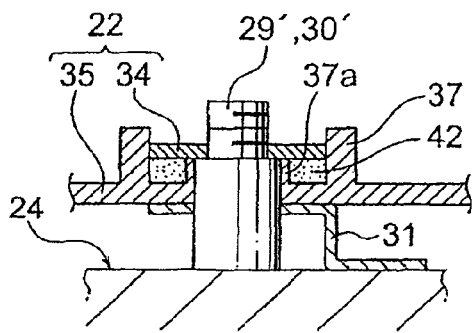
FIG. 3A through 3F are cross sectional views of a heat conductive member of the invention.

In an embodiment shown in FIG. 3A, the heat conductive portion 42 is provided between the bus bar 34 and the bus-bar installation portion 37 in a manner shown. The bus-bar installation portion 37 is provided with a plate 37a to support the bus bar 34. Also in this embodiment, electrodes 29', 30' provided on a base are provided to support the bus bar 34. The heat conductive portion 42 is a concave portion provided adjacent to the plate 37a and is in close contact with the bus bar 34, as shown. The heat conductive portion 42 is formed with resin material including silicone resin material or epoxy resin material, such as potting material (e.g. two-component gel SE1896FR) or heat conductive material (e.g. elastomer SE4485). Arbitrary, a connecting plate 31 can be provided when using the electrodes 29', 30' of this embodiment with the base.

Figure 3C:
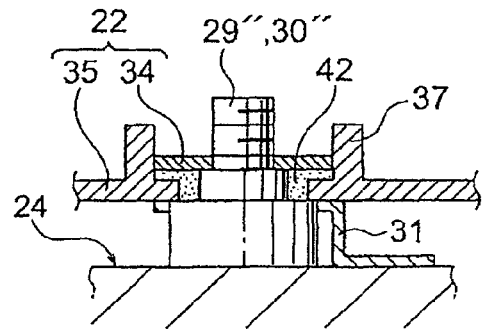
Figure 3B:
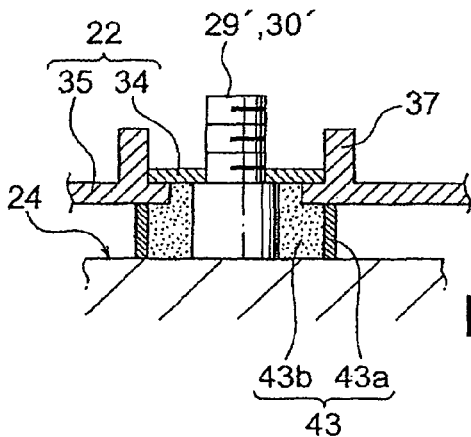

In an embodiment shown in FIG. 3B, heat conductive portion 43 is provided between the battery cell 24 and the bus-bar module 22 in a manner shown. A frame 43a, formed for example of elastic material (such as a sponge), is provided to the cell 24 to fill inside the frame 43a with the above-described potting material 43b to form the heat conductive portion 43. The heat conductive portion 43 is in close contact with the bus-bar module 22.

In an embodiment shown in FIG. 3C, the heat conductive portion 42 is provided between the bus bar 34 and electrodes 29", 30" provided on two piled-up bases in a manner shown. The heat conductive portion 42 is in close contact with the bus bar 34 and the electrodes 29", 30".

Figure 3D:
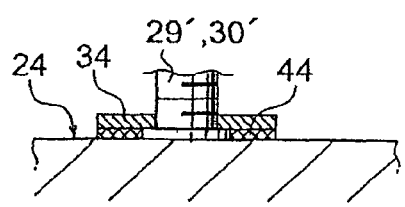
Figure 3E:
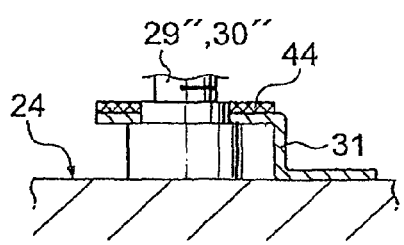
Figure 3F:
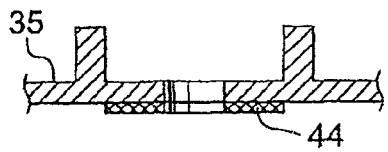

In embodiments shown in FIGS. 3D, 3E and 3F, heat conductive portion 44 is for example a seat formed with the above-mentioned heat conductive material, so as to be pasted to the battery cell 24 (as shown in FIG. 3D), or pasted to the connecting plate 31 (as shown in FIG. 3E), or pasted to the resin member 35 (as shown in FIG. 3F). The heat conductive portion 44 is arranged so as to be in close contact with the second and the third cooling member.

Other examples of the high-voltage electrically conducting path will be explained with reference to FIG. 4 and FIG. 5.

Figure 4:
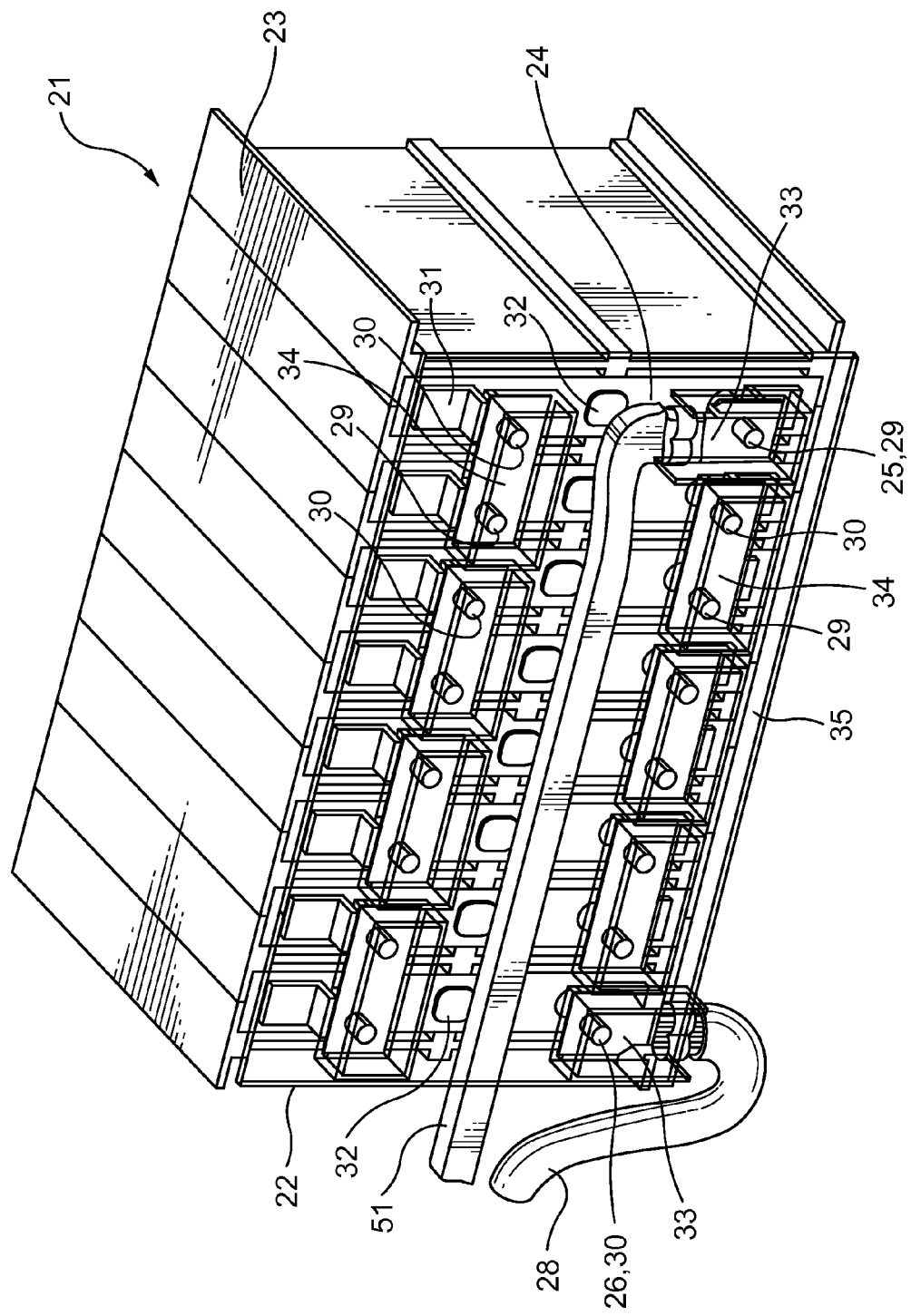
FIG. 4 is a perspective view of the another exemplary embodiment the cooling system for the battery pack according to the present invention.
Figure 5A:
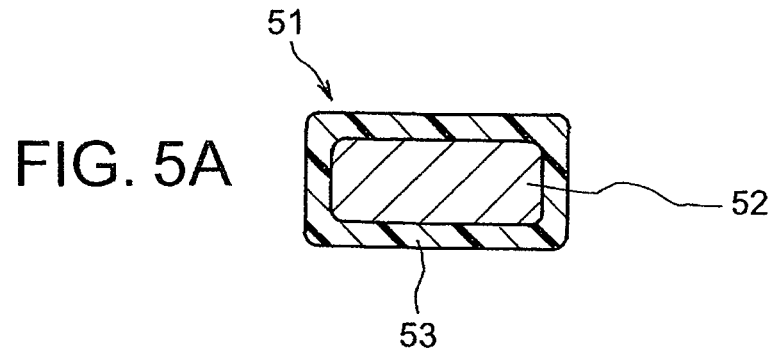
FIG. 5A through 5C are cross sectional views of several high-voltage electrically conducting paths according to the invention.

The battery pack 21 provided with the bus-bar module 22 shown in FIG. 4 is the same as the battery pack 21 of FIGS. 1 and 2 except for a thick electric wire 51 (the high-voltage electrically conducting path). As shown in FIG. 5A, the thick electric wire 51 includes a rectangular conducting portion 52 and a cover 53 covering the rectangular conducting portion 52. This thick wire 51, not like the thick wire 27 of FIG. 1 and FIG. 2, does not include twisted conducting portion, but includes the rectangular conducting portion 52. Accordingly, a contacting area of the thick wire 51 having a large contacting surface and the resin member 35 can be large, and also a height of the thick wire can be reduced. The cover 53 at an end of the thick wire 51 is removed for a predetermined length, so as to expose the rectangular conducting portion 52. The connection terminal 33 is fixed to the exposed portion of the rectangular conducting portion 52 by for example latching.

Figure 5B:
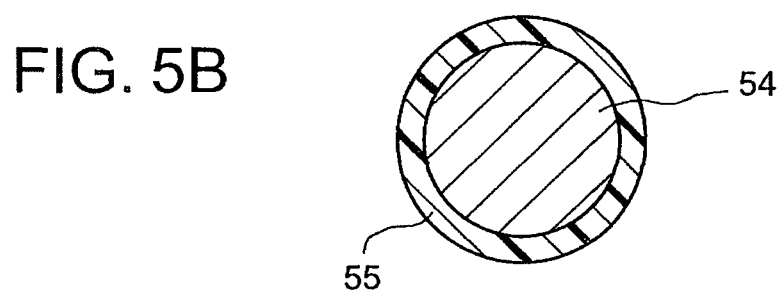
Figure 5C:
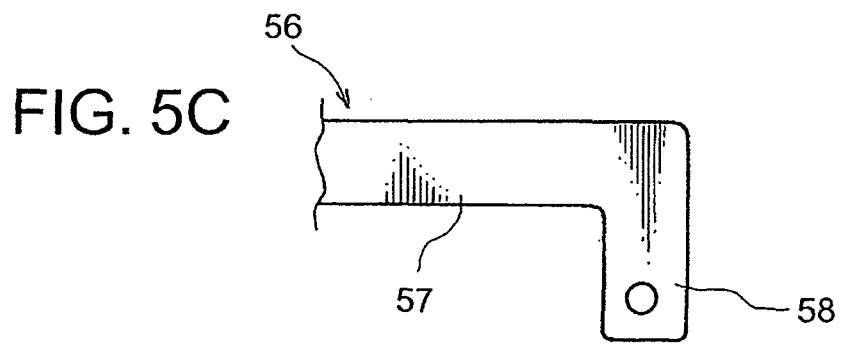
Figure 6:
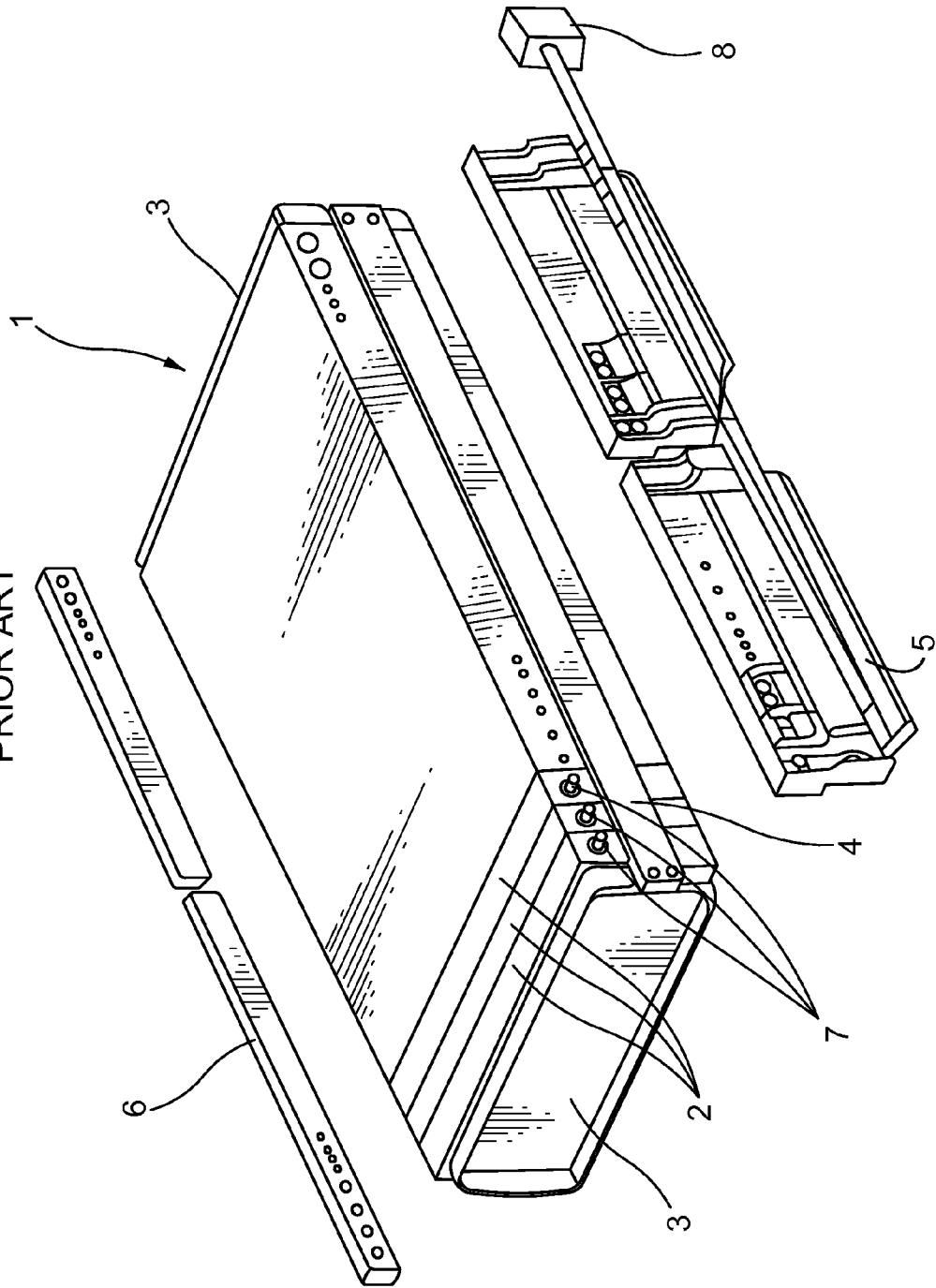
FIG. 6 is an exploded perspective view of a prior art.

If there is no limitation to the height of the thick wire 51, the thick wire 51 may have a circular-in-cross-section conducting portion 54 and a cover 55, as shown in FIG. 5B. In another example, a bus bar 56 can be employed instead of the thick wire 51, as shown in FIG. 5C. FIG. 5C shows one example of such bus bar 56, in which a belt-like bus bar body 57 which is provided with a connection terminal 58. The connection terminal 58 serves similar function as the connection terminal 33 and is connected to the positive electrode 25. The bus bar 58 has superior electric conductivity.

According to the present invention, it is especially advantageous to arrange the high-voltage electrically conducting portion along the high-temperature area of the battery pack 21.

The invention claimed is:

1. A cooling system for a battery pack, comprising:
a plurality of battery cells of the battery pack arranged in a line in a predetermined direction, the respective battery cells being electrically connected in series, and
high-voltage electrically conducting members connected respectively to a positive electrode and to a negative electrode of the battery pack and extending to outside of the battery pack,
wherein at least one of the high-voltage electrically conducting members is arranged along the battery pack over the plurality of battery cells to serve as a cooling member of the battery pack, and
wherein the high-voltage electrically conducting members comprise a thick wire held by a thick-wire installation portion comprising a hook, a cover or a plate.

2. The cooling system for the battery pack according to claim 1, wherein the battery cells are connected electrically in series by a bus-bar module having a plurality of bus bars and a resin member, and wherein at least one of the resin member and the bus bar serves as the cooling member of the battery pack.

3. The cooling system for the battery pack according to claim 2, wherein an installation portion for the high-voltage electrically conducting member is provided at the resin member.

4. The cooling system for the battery pack according to claim 3, wherein the resin member is formed of one material selected from a group including a silicone resin material and an epoxy resin material.

5. The cooling system for the battery pack according to claim 4, wherein at least one of the high-voltage electrically conducting members are arranged between a positive electrode and a negative electrode of the battery cells to serve as the cooling member of the battery pack.

6. The cooling system for the battery pack according to claim 3, wherein at least one of the high-voltage electrically conducting members are arranged between positive electrodes and negative electrodes of the battery cells to serve as the cooling member of the battery pack.

7. The cooling system for the battery pack according to claim 2, wherein a heat conductive member is provided at least one of a position between the bus bar and the resin member and a position between the battery cell and the bus-bar module.

8. The cooling system for the battery pack according to claim 7, wherein the resin member is formed of one material selected from a group including a silicone resin material and an epoxy resin material.

9. The cooling system for the battery pack according to claim 8, wherein at least one of the high-voltage electrically conducting members are arranged between a positive electrode and a negative electrode of the battery cells to serve as the cooling member of the battery pack.

10. The cooling system for the battery pack according to claim 7, wherein at least one of the high-voltage electrically conducting members are arranged between positive electrodes and negative electrodes of the battery cells to serve as the cooling member of the battery pack.

11. The cooling system for the battery pack according to claim 2, wherein the resin member is formed of one material selected from a group including a silicone resin material and an epoxy resin material.

12. The cooling system for the battery pack according to claim 11, wherein at least one of the high-voltage electrically conducting members are arranged between a positive electrode and a negative electrode of the battery cells to serve as the cooling member of the battery pack.

13. The cooling system for the battery pack according to claim 1, wherein at least one of the high-voltage electrically conducting members are arranged between positive electrodes and negative electrodes of the battery cells to serve as the cooling member of the battery pack.

14. The cooling system for the battery pack according to claim 2, wherein at least one of the high-voltage electrically conducting members are arranged between positive electrodes and negative electrodes of the battery cells to serve as the cooling member of the battery pack.

* * * * *